April 25, 1967 W. H. HULTGREN 3,315,809
FILTER UNIT WITH BY-PASS AND ANTI-DRAIN BACK VALVE
Filed Sept. 24, 1965 2 Sheets-Sheet 1

INVENTOR
William H. Hultgren

BY Lawrence J. Winter

ATTORNEY

April 25, 1967     W. H. HULTGREN     3,315,809
FILTER UNIT WITH BY-PASS AND ANTI-DRAIN BACK VALVE
Filed Sept. 24, 1965     2 Sheets-Sheet 2
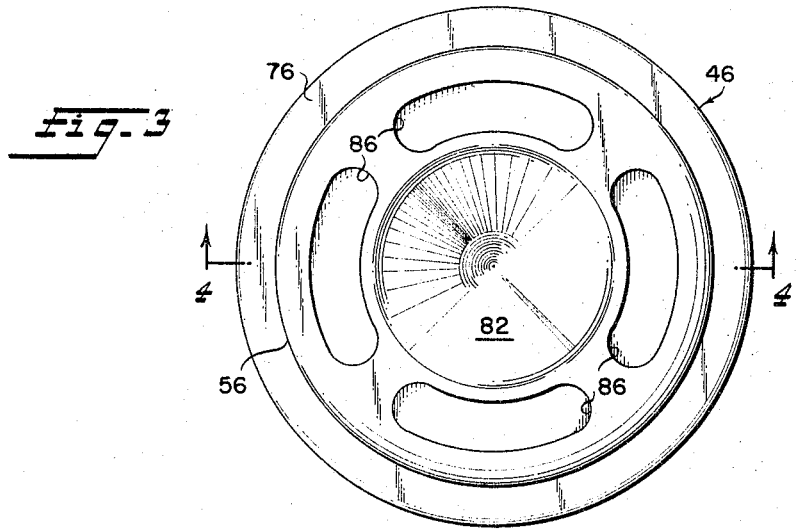
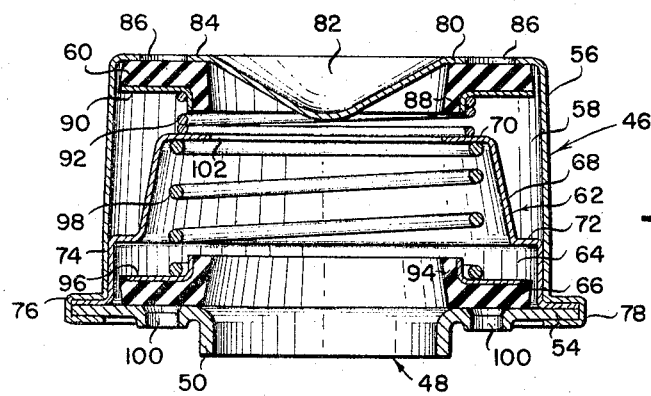
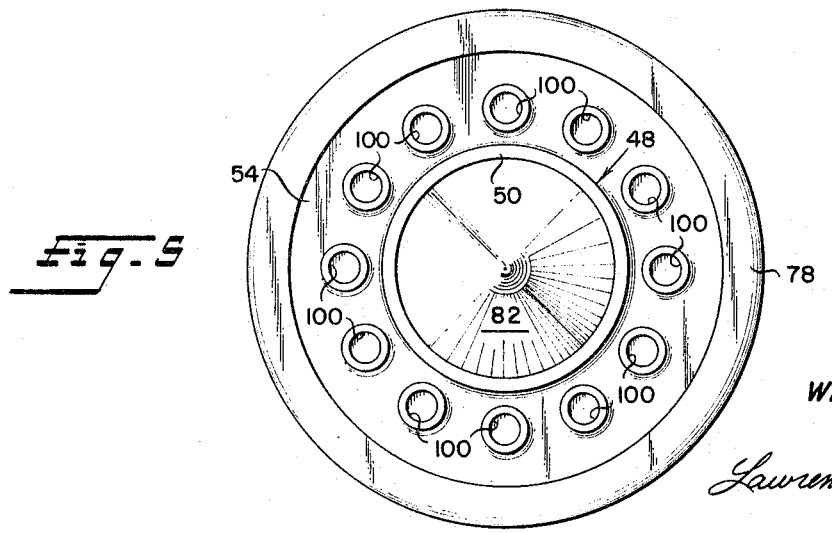
INVENTOR
William H. Hultgren
ATTORNEY

United States Patent Office 3,315,809
Patented Apr. 25, 1967

3,315,809
FILTER UNIT WITH BY-PASS AND ANTI-DRAIN BACK VALVE
William H. Hultgren, Mount Carmel, Ill., assignor to Champion Laboratories, Inc., West Salem, Ill., a corporation of Connecticut
Filed Sept. 24, 1965, Ser. No. 490,137
13 Claims. (Cl. 210—130)

The present invention relates to a filter unit and more particularly to a filter unit that is adapted to be threaded onto an engine block and which filter unit is provided with a combination by-pass valve and an anti-drain back valve.

In accordance with the present invention, the oil filter unit is a throw away type spin-on filter unit that is disposed on the engine block of an engine and is adapted to receive the full flow of all of the oil in the engine so as to filter the dirt and contaminants from the stream of oil passing through the filter unit. In the present oil filter unit the oil pump of the internal combustion engine forces the oil through the oil filter, out of the engine block, and back into the engine block after it passes through the filter cartridge that is enclosed within the filter unit. Thus the total flow of oil is circulated through the filter unit, as compared with a part flow oil filter in which only a fraction of the oil is progressively filtered therethrough with the remaining portion or fraction of the oil bypassing the filter unit.

From the foregoing operation of the oil filter unit, it is obvious that since the full flow of oil is passed through the filter unit, it is necessary to provide means to by-pass the oil around the filter cartridge in the filter unit, or in other words to short circuit the oil flow pass through the filter unit, should the filter become clogged due to contaminant or for any other reason, such as the cold starting of the engine.

This throw away spin-on type of oil filter unit also necessitates an anti-drain back valve or one way valve in order to prevent oil from the engine parts from leaking back through the filter casing to the coil reservoir or the engine crank case when the engine is shut down, so that upon initial starting of the engine at a later time the engine will not be starved of oil.

It is an object of the present invention to provide a full flow type spin-on oil filter that is directly connected to an engine block of an internal combustion engine which oil filter unit has a normal flow path therethrough, so that the oil is filtered by an oil filter cartridge encased within the housing, and is also provided with a secondary oil flow path so that the oil may be by-passed or short circuited around the filter cartridge when it becomes clogged.

It is another object of the present invention to provide a full flow oil filter with a by-pass valve and an anti-drain back valve assembly disposed in the filter housing in two separate or different flow paths.

It is another object of the present invention to provide a combination by-pass and anti-drain back valve assembly that can be inserted as a single unit within a spin-on type oil filter and which assembly does not have to be permanently secured to the filter cartridge of the oil filter.

It is another object of the present invention to provide a combination by-pass and anti-drain back valve assembly with means for supporting the filter cartridge that is permanently sealed within a throw away type oil filter unit.

It is another object of the present invention to provide a by-pass and anti-drain back valve combination for a spin-on type oil filter in which the by-pass valve and the anti-drain back valve are provided with separate spring load means for biasing the respective valves into a seated position.

It is yet another object of the present invention to provide a valve assembly having two separate cup means for the by-pass valve disc means and its spring loading means, and for the anti-drain back valve disc and its spring loading means.

Another object of the present invention is to provide an assembly for the by-pass valve and the anti-drain back valve provided with an extra cup means that permits the anti-drain back valve to be placed ahead of the by-pass valve assembly so that the anti-drain back valve parts are not disposed in the main oil stream, and so that these parts of the anti-drain back valve can be made larger, to thereby reduce restriction through the valve means by the use of larger openings therein.

It is another object of the present invention to provide the combination or assembly of a by-pass valve means and an anti-drain back valve means in which the two valve means are disposed in series and are separately spring loaded, making it easier to streamline the oil flow therethrough and consequently decrease any restriction in flow therethrough.

It is another object of the present invention to provide an assembly consisting of a by-pass valve means and an anti-drain back valve means wherein there is provided a conical nose cone on the inside of the anti-drain back valve chamber which has the effect of further streamlining oil flow through the whole assembly.

It is yet another object of the present invention to provide an assembly of a by-pass valve and an anti-drain back valve so that the anti-drain back valve is not positioned within the by-pass valve housing itself, and thereby will not increase the restriction to oil flow through the filter unit.

It is another object of the present invention to provide an assembly which has a casing enclosing both the by-pass valve means and the anti-drain back valve means so that the assembly can be disposed within the center tube of a filter cartridge as a unit, and further which keeps oil flow restriction to an absolute minimum even when the anti-drain back valve is placed down stream of the filter cartridge or element itself, so that minimum restriction to oil flow is added to the total restriction across the filter element or cartridge so that it will not cause the by-pass valve means to open prematurely, shortening the servicable life of the filter element itself.

Further objects and advantages of the present invention will be readily apparent from the following detailed description when the description is considered in connection with the accompanying drawings forming a part thereof, and in which:

FIGURE 3 is a top plan view of the valve assembly shown in FIGURE 1 but on an enlarged scale;

FIGURE 4 is a detailed section taken along the line 4—4 of FIGURE 3, and

FIGURE 5 is a bottom plan view of the valve assembly shown in FIGURE 4.

Figure 1:
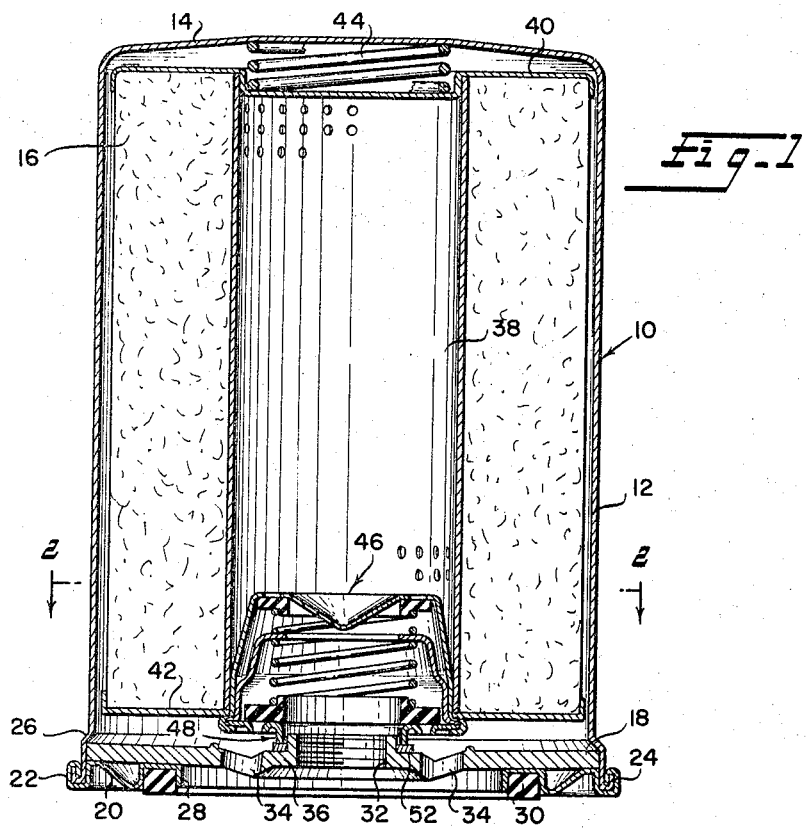
FIGURE 1 is a vertical sectional view of an oil filter unit embodying the present invention.

Referring to the drawings the reference numeral 10 generally designates an oil filter unit having a cylindrical shell or casing 12 having an upper closed in 14 and in which encased a filter element or cartridge 16. The bottom of the cylindrical housing or casing 12 is closed off by a closure member or circular plate 18. The plate 18 is disposed within the lower end of the casing 12 by a retainer plate 20 disposed against the bottom of the closure member 18. The annular retainer plate 20 is provided with an outwardly and upwardly turned lip 22 that is rolled over a complementary lip 24 disposed on the bottom edge of the casing 12 so as to form a rolled seam. It will be noted that the outer edge of the closure member 18 is prevented from moving upwardly in the casing 12 by a flared portion 26 of the casing.

The retainer plate 20 may be tack welded at various points to the closure member 18. The inner periphery of the retainer plate 20 is provided with an annular recess 28 that is substantially rectangular shape in cross section. A resilient gasket 30 is disposed within the recess 28 so as to form a liquid tight seal against the block of an engine when the filter unit is secured thereto.

The central portion of the closure member 18 is provided with an inturned threaded nipple or bushing 32 forming a central oil outlet opening, the nipple 32 is also provided with a substantially horizontal annular shoulder 36 therearound and a plurality of circumferentially spaced oil inlet openings or ports 34 are disposed in the closure member radially outwardly of the nipple and the shoulder 36, and radially inwardly of the gasket member 30.

The filter element or cartridge 16 is preferably of a well known resin impregnated pleated paper disposed around a perforated center tube 38 and having its opposite ends sealed off by incaps 40 and 42. The incap 40 closes off the adjacent end of the center tube and a spring 44 is disposed in a recess formed in the incap 40 so as to maintain the filter element 16 in a seated position as described hereinafter in the filter housing.

Figure 2:
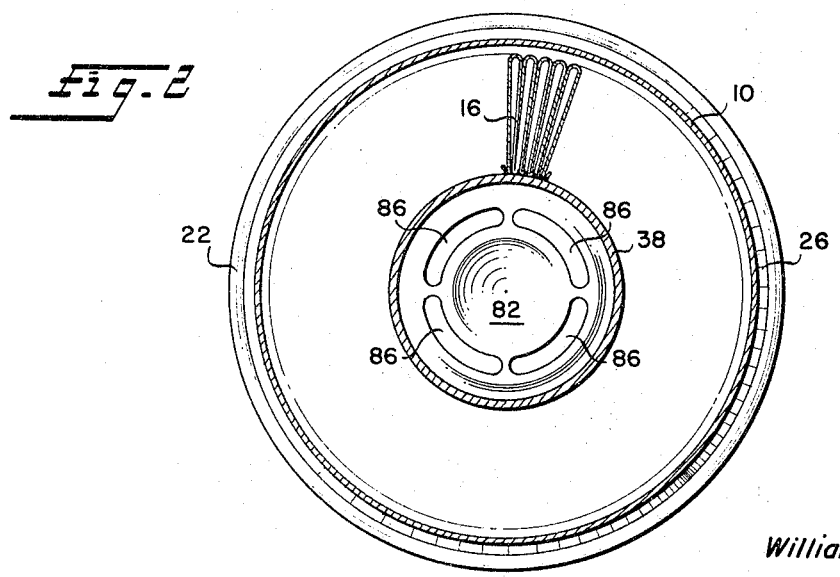
FIGURE 2 is a transverse section taken along the line 2—2 of FIGURE 1.

The combination or assembly of the by-pass valve means and the anti-drain back valve means embodied in the present invention is generally designated as 46 and consists of an integral or single unit that can be inserted within the ends of the center tube 38 as best seen in FIGURE 1. The valve assembly 46 also serves as a filter support member 48. The filter support member 48 comprises a sleeve 50 which is seated on a ring gasket member 52 that is disposed on the shoulder 36 around the nipple 32 so as to form an oil tight or liquid tight seal with the closure member 18. The sleeve 50 is of slightly larger size or diameter than the outside diameter of the nipple 32 so that it can be readily mounted over the nipple 32. The sleeve 50 extends above the upper edge of the nipple 32 and thereafter extends in a horizontal direction outwardly away from the nipple 32 a substantial distance so as to provide a horizonal annular flange or rim 54. The horizontal rim 54 provides a seat adjacent its outer periphery for the inner end of the filter cartridge 16 and the center tube 38 as best shown in FIGURE 2.

The valve assembly 46 is provided with an outer casing or wall 56 forming a chamber 58 for the anti-drain back valve 60.

An inner casing 62 is disposed within the outer casing 56 and provides a chamber 64 for the by-pass valve 66.

The inner casing 62 has an inner and upwardly extending portion 68 with an inturned horizontal rim or flange 70 adjacent its upper edge. The lower end of the diagonal portion 68 has an outwardly extending horizontal rim or flange 72 and the casing 62 extends in a substantially vertical direction at 74 below the flange 72 and terminates in an outward horizontal flange or lip 76.

The lip 76 is secured between a reverse bend 78 disposed on the lower edge of the outer casing 56 so as to clamp the outer edge of the horizontal flange 54 on the sleeve 50 and the lip 76 of the inner casing therebetween. The outer casing 56 extends upwardly and is in substantial contact with the vertical portion 74 of the inner casing and thereafter extends upwardly in spaced relationship with the portion 68 of the inner casing so that the chamber 58 is disposed between the inner and the outer casing. The upper edge of the outer casing 56 is provided with an inwardly extending section 80 that closes off the top of the casing 56 and is formed with a central conical section or cone 82 extending inwardly of the casing 56, as best shown in FIGURE 4. The annular portion 84 of the section 80 around the central conical section 82 is provided with a plurality of circumferentially spaced elongated arcuate slots or oil inlet openings. The annular elastometer anti-drain back valve disc 60 is adapted to seat against the annular portion 84 and to close off the oil openings 86. The valve disc 60 is provided with a downwardly extending portion 88 adjacent its inner periphery and has an L-shaped metal member 90 secured by any suitable means to the bottom thereof. The metal portion 90 and the downwardly extending portion 88 have a biasing spring 92 mounted thereagainst and seated against the inturned flange 70 of the inner casing 68 so as to normally maintain the anti-drain back valve disc 60 seated over the openings 86 until such time as the oil pressure passing through the center tube 38 of the filter cartridge exceeds a predetermined desired pressure. It will be noted that the anti-drain back valve 60 and its spring 92 are disposed in the chamber 58 and are entirely outside of the by-pass flow chamber 64 so that they in no way restrict the flow of oil through the chamber 64. It will further be noted that the elongated arcuate oil inlet openings 86 and the conical shape 82 of the top of the casing 56 permit a flow through the chamber 58 that has the effect of streamlining the oil flow through the assembly. Thus this configuration keeps restriction of oil to an absolute minimum even though the anti-drain back valve is placed down stream from the filter element itself. Therefore, this minimum restriction will not cause the by-pass valve to open prematurely or to shorten the life of the filter cartridge itself.

The by-pass valve disc 66 is annular and is provided with an upturned portion 94 and has an L shape reinforcement member 96 secured to its upper side so as to receive the lower end of a biasing spring 98 mounted thereon, which spring has its upper end disposed adjacent the underside of the inturned flange 70.

The horizontal flange 54 of the filter support member is provided with a plurality of circumferentially spaced oil by-pass ports 100 disposed therein adjacent the inner end or the sleeve 50. The valve disc 66 is disposed to seat over these oil by-pass ports 100 and the biasing spring 98 normally maintains the valve seated when the differential pressure across the filter cartridge 16 is below a predetermined value. When the differential pressure exceeds this predetermined value due to the upstream side of the pleats of the cartridge becoming contaminated with dirt and contaminant, the oil will pass through the ports 100 and the oil pressure will unseat the valve disc 66 from the position shown in FIGURE 4. Thereafter the oil will flow through the by-pass ports 100 and into the by-pass chamber 64 and out of the nipple 32 so as to completely short circuit and by-pass the clogged filter cartridge 16. It will be noted that the oil opening 102 formed by the inner circumference of the flange 70 is in alignment with sleeve 50 and the nipple 32 and the flow path formed between the conical section 82 and the elongated oil openings 86 when the valve disc 60 is unseated.

When the oil filter unit has been properly secured to an engine block not shown in the internal combustion engine not shown is started, the oil pump of the engine not shown supplies oil through the oil inlet port 34 to the interior of the oil filter unit housing 12. The oil then flows through the filter cartridge 16 in an outside-in direction and the clean oil is discharged through the perforated center tube 38 and passes through the elongated oil openings 86, the oil pressure overcoming the force in the spring 92 holding the anti-drain back valve disc 60 in a seated position. Thereafter the oil flows through the oil opening 102 and through the interior of the by-pass casing 68 forming the by-pass chamber 64, and is discharged through the nipple 32 and back into the engine.

The configuration on the conical section 82 and the elongated openings 86 disposed radially outwardly of the conical section 82 provide a streamline flow through the assembly. It will be noted that the anti-drain valve assembly is disposed in the outer casing, and outside of the inner casing which contains the by-pass valve assembly, so that the anti-drain back valve parts are not in the main oil stream, and therefore the parts of the anti-drain back valve can be made larger, thereby reducing restriction to oil flow through the use of larger openings. If the anti-drain back valve assembly were nested within the by-pass valve casing, it would make for an extremely crowded condition and thereby cause an increase in resistance to the flow of oil through the filter unit.

Thus the anti-drain back valve is disposed so that there will be a minimum restriction added to the total restriction across the filter cartridge and therefore the by-pass valve will not be caused to open prematurely, shortening the life of the filter cartridge itself.

When the filter element 16 becomes sufficiently clogged so that the oil pressure entering the oil inlet ports 34 of the casing 12 exceeds a predetermined pressure because of the restricted flow through the filter element, the oil pressure will then cause the by-pass valve disc 66 to unseat. The opening of the by-pass valve disc 66 will then permit the oil entering the oil inlet ports 34 to pass through the oil by-pass ports 100 and into the by-pass chamber 64 and out of the casing through the nipple 32, the oil thereby short circuiting the filter cartridge and preventing the engine from being starved of engine oil in spite of the fact the oil filter cartridge is clogged. The provision of the inner casing 68 with the by-pass valve 66 and its spring 98 disposed therein will permit the by-pass valve and the anti-drain back valve to be separately spring loaded and avoid any undue restriction of the flow of oil through the filter cartridge or around the filter cartridge in the short circuit flow path already described. From the foregoing description it will be apparent that various changes may be made in the form, location and relative arrangement of several parts without departing from the essential characteristics of the invention, and it is to be understood that this invention is not to be limited except by the scope of the appended claims.

What is claimed is:

1. A spin-on type oil filter unit comprising a housing with a closure member having an oil inlet and oil outlet therein, an annular filter element in said housing, and a by-pass and anti-drain back valve assembly disposed in said housing including sleeve means with a filter element support member, outer casing means disposed on said support member forming an anti-drain back chamber, said filter element seated on said support member around said outer casing means, oil inlet port means in said outer casing means, an anti-drain back valve positioned to cover said oil inlet port means, biasing means in said chamber urging said valve to a seated position, an inner casing means on said support member communicating at the top thereof with said outer casing means and disposed within said outer casing means and forming a by-pass chamber inwardly of said anti-drain back chamber, by-pass oil port means in said support member, a by-pass valve covering said by-pass port means, separate by-pass biasing means urging said by-pass valve to a seated position, said by-pass valve being disposed within said inner casing means and in said by-pass chamber.

2. The filter unit of claim 1 wherein said filter support member includes an annular horizontal portion extending outwardly from said sleeve member.

3. The filter unit of claim 2 wherein said outer casing means is cylindrical and said inlet oil port means therein consist of a plurality of elongated slots circumferentially spaced around the top of said outer casing means, and a conical section is provided in said top inwardly of said slots.

4. The filter unit of claim 3 wherein said valves consist of an annular resilient member with a projecting annular portion adjacent the center thereof.

5. The unit of claim 4 wherein the projecting portion on said anti-drain back valve extends downwardly, and the projecting portion on said by-pass valve extends upwardly.

6. The unit of claim 1 wherein said outer casing means extends into said annular element and is provided with an annular reverse bend clamping said outer casing means to said support member and the top of said outer casing means has a depressed central conical section, and said oil inlet port means are arcuate elongated slots in said top disposed around said conical section.

7. The unit of claim 6 wherein said inner casing means has an annular lip clamped between said support member and reverse bend, said inner casing means extends upwardly from its annular lip in contact with the inner surface of said outer casing means then extends diagonally inwardly and away from the inner surface of said outer casing means, and has an inturned annular flange on its upper edge, and said anti-drain back valve biasing means rests on the outer surface of said inturned flange, and said by-pass biasing means rests on the under surface of said inturned flange, and the inner periphery of said inturned flange provides a port communicating said slots with the interior of said inner casing means.

8. A full flow throwaway spin-on type filter comprising a cylindrical housing open at one end, a closure member secured to said housing at said one end and closing off said one end, said closure member having an oil outlet nipple and an oil inlet, an annular filter element sealed in said housing, a filter support member disposed on said nipple including a sleeve and a horizontal annular rim extending outwardly from the end of said sleeve disposed away from said nipple, said annular filter element being supported on said rim, a cylindrical outer casing having a reverse bend clamping the casing to said rim said casing extending upwardly into said filter element, an inner casing having an annular lip clamped between said reverse bend and said rim, said inner casing extending upwardly into said outer casing and having a portion spaced inwardly of said outer casing to provide an anti-drain back chamber therebetween, the interior of said inner casing providing a by-pass valve chamber therein, by-pass oil port means in said rim radially inwardly of said inner casing, an annular by-pass disc valve in said inner casing covering said by-pass port means, a spring in said inner casing bearing against its inner surface and said disc valve to normally urge said valve seated when the oil pressure across said filter element is below a predetermined value, oil inlet port means in the top of said outer casing, an annular anti-drain back disc valve in said outer casing and outside of said inner casing covering said oil port inlet means, a spring member bearing against the outer surface of said inner casing and said anti-drain back disc valve and located in said anti-drain back chamber for urging said anti-drain back valve to a seated position, said outer casing having a conical depression in its top, and said anti-drain back valve surrounding said conical depression, and said inner casing having an inturned flange adjacent its top forming a flow port between said anti-drain back and by-pass chambers.

9. The filter of claim 8 wherein said inner casing extends diagonally inwardly from said outer casing and said inturned flange is located below said conical depression.

10. The filter of claim 9 wherein said oil port means in said outer casing are a plurality of elongated slots spaced circumferentially of said conical depression.

11. The filter of claim 10 wherein said by-pass valve is disposed in a portion of said casing that bears against the inner surface of said outer casing.

12. The filter of claim 11 wherein both said valves have a projecting portion adjacent the center thereof for mounting its respective spring member thereon.

13. The filter of claim 12 wherein said by-pass spring member is disposed radially outwardly of the flow path area formed by said flow port formed by said inturned flange.

References Cited by the Examiner

UNITED STATES PATENTS 3,184,062   5/1965   Humbert _____ 210—130

REUBEN FRIEDMAN, *Primary Examiner.*

W. BRADBURY, *Assistant Examiner.*